US011027412B2

(12) United States Patent
Üyünük et al.

(10) Patent No.: US 11,027,412 B2
(45) Date of Patent: Jun. 8, 2021

(54) SELF-ALIGNED TILT AND YAW SYSTEM FOR WIND TURBINE BLADE ROTATING DEVICE

(71) Applicant: TPI Composites, Inc., Warren, RI (US)

(72) Inventors: Mehmet Üyünük, Izmir (TR); Furkan Ünal, Izmir (TR); Ata M. Alper, Izmir (TR)

(73) Assignee: TPI Composites, Inc., Warren, RI (US)

(*) Notice: Subject to any disclaimer, the term of this patent is extended or adjusted under 35 U.S.C. 154(b) by 8 days.

(21) Appl. No.: 16/373,292

(22) Filed: Apr. 2, 2019

(65) Prior Publication Data

US 2019/0301430 A1 Oct. 3, 2019

Related U.S. Application Data

(60) Provisional application No. 62/651,581, filed on Apr. 2, 2018, provisional application No. 62/651,586, filed
(Continued)

(51) Int. Cl.
*F03D 13/40* (2016.01)
*B25H 1/00* (2006.01)
(Continued)

(52) U.S. Cl.
CPC ............... *B25H 1/005* (2013.01); *B60P 3/40* (2013.01); *F03D 13/40* (2016.05); *F16M 11/10* (2013.01);
(Continued)

(58) Field of Classification Search
CPC .................................. F03D 13/40; B25H 1/005
(Continued)

(56) References Cited

U.S. PATENT DOCUMENTS

| 3,430,981 A | 3/1969 | Tarantola |
| 4,243,350 A | 1/1981 | Hall |

(Continued)

FOREIGN PATENT DOCUMENTS

| CN | 104421097 A | 3/2015 |
| CN | 205336053 U | 6/2016 |

(Continued)

OTHER PUBLICATIONS

International Search Report and Written Opinion for International Application No. PCT/US2019/025425 dated Jun. 24, 2019.
(Continued)

*Primary Examiner* — Lynn E Schwenning
(74) *Attorney, Agent, or Firm* — Foley Hoag LLP; Stephen J. Kenny

(57) ABSTRACT

A wind turbine blade apparatus comprising a root device including: a base having an upper surface with a radius of curvature and configured to receive a root portion of a blade, with housings disposed on lateral sides of the base. The housings including a groove configured to receive a bearing and a shaft extending at least partially through the base and housing. A tip device is also provided which includes a base, a rotatable support frame having: a first support configured to receive a pressure side of a wind turbine blade, a second support configured to receive a suction side of a wind turbine blade, and an opening, the opening configured to receive a portion of a wind turbine blade.

19 Claims, 8 Drawing Sheets

Related U.S. Application Data on Apr. 2, 2018, provisional application No. 62/651,588, filed on Apr. 2, 2018, provisional application No. 62/651,601, filed on Apr. 2, 2018.

(51) Int. Cl.

| | | |
|---|---|---|
| *F16M 11/10* | (2006.01) | |
| *F16M 11/18* | (2006.01) | |
| *F16M 11/38* | (2006.01) | |
| *F16M 11/42* | (2006.01) | |
| *B60P 3/40* | (2006.01) | |
| *B62B 5/00* | (2006.01) | |

(52) U.S. Cl.
CPC .............. *F16M 11/18* (2013.01); *F16M 11/38* (2013.01); *F16M 11/42* (2013.01); *B62B 5/003* (2013.01); *B62B 5/0033* (2013.01); *F05B 2240/941* (2013.01); *F05B 2260/02* (2013.01); *F05B 2260/30* (2013.01); *F16M 2200/022* (2013.01); *F16M 2200/028* (2013.01)

(58) Field of Classification Search
USPC .......................................................... 414/764
See application file for complete search history.

(56) References Cited

U.S. PATENT DOCUMENTS

| | | | |
|---|---|---|---|
| 5,251,893 A | 10/1993 | Schoenhenz | |
| 5,885,040 A | 3/1999 | Parker | |
| 7,303,365 B2 | 12/2007 | Wobben | |
| 7,670,090 B1 | 3/2010 | Landrum et al. | |
| 8,632,286 B2 * | 1/2014 | Wessel .................... | F03D 80/00 410/35 |
| 8,708,625 B1 | 4/2014 | Landrum et al. | |
| 9,004,843 B2 | 4/2015 | Lemos et al. | |
| 9,347,426 B2 | 5/2016 | Landrum et al. | |
| 9,638,162 B1 | 5/2017 | Fletcher et al. | |
| 9,945,351 B2 | 4/2018 | Lulker et al. | |
| 10,857,663 B2 | 12/2020 | Uyunuk et al. | |
| 2009/0020445 A1 | 1/2009 | Koike | |
| 2009/0169323 A1* | 7/2009 | Livingston ............ | F03D 1/0675 410/120 |
| 2011/0008147 A1 | 1/2011 | Lemos et al. | |
| 2011/0031292 A1* | 2/2011 | Krogh ...................... | B60P 3/40 224/553 |
| 2012/0124833 A1* | 5/2012 | Arendt .................... | F03D 13/40 29/889.7 |
| 2013/0104376 A1 | 5/2013 | Pedersen | |
| 2013/0315685 A1* | 11/2013 | Pedersen ................. | F03D 13/40 410/44 |
| 2014/0356113 A1 | 12/2014 | Schmidt et al. | |
| 2015/0028610 A1* | 1/2015 | Hansen ................... | F03D 13/40 294/81.55 |
| 2015/0329036 A1 | 11/2015 | Johnson et al. | |
| 2015/0337799 A1* | 11/2015 | Hansen ..................... | B60P 3/40 410/44 |
| 2016/0302545 A1 | 10/2016 | Berger | |
| 2018/0223811 A1 | 8/2018 | Fletcher et al. | |

FOREIGN PATENT DOCUMENTS

| | | |
|---|---|---|
| CN | 108423399 A | 8/2018 |
| DE | 10211357 A1 | 9/2002 |
| DE | 202016100449 U1 | 5/2017 |
| EP | 2584191 A1 | 4/2013 |
| KR | 20090132080 A | 12/2009 |
| WO | WO-2012/048719 A1 | 4/2012 |
| WO | WO-2017/131515 A1 | 8/2017 |
| WO | WO-2019/195322 A1 | 10/2019 |

OTHER PUBLICATIONS

International Search Report and Written Opinion for International Application No. PCT/US2019/025429 dated Jun. 24, 2019.
International Search Report and Written Opinion for International Application No. PCT/US2019/025432 dated Jun. 20, 2019.
International Search Report and Written Opinion for International Application No. PCT/US2019/025442 dated Jun. 18, 2019.

* cited by examiner

SELF-ALIGNED TILT AND YAW SYSTEM FOR WIND TURBINE BLADE ROTATING DEVICE

CROSS-REFERENCE TO RELATED APPLICATIONS

This application claims the benefit under 35 USC 119 of priority to U.S. Provisional Application Nos. 62/651,581, 62/651,586, 62/651,588 and 62/651,601 filed Apr. 2, 2018, the entire contents of each are hereby incorporated by reference.

BACKGROUND OF THE DISCLOSED SUBJECT MATTER

Field of the Disclosed Subject Matter

The disclosed subject matter relates to a wind turbine rotor blade handling system and apparatus for moving a wind turbine rotor blade, and a corresponding method of operating such a handling system.

Description of Related Art

A variety of methods and systems are known for use in the manufacturing process of wind turbine blades, including carts acting to support a section of the wind turbine blade, e.g. after removal from the blade mold, and during post molding operations (e.g. external blade surface grinding or coating operations).

Conventional blade carts comprise an enclosed ring structure which is fitted around the body of the blade. However, as blade dimensions increase, these carts are often difficult to mount to the blade. Often times a crane is required to support the blade weight while the cart is moved (often manually) along the blade. In addition, the cart presents a hazard during post molding operations where people and equipment are hindered by the large ring, and prevented from easily accessing the blade leading and trailing edges at the location of the cart.

Conventional blade carts are configured with closed brackets forming a closed ring into which the wind turbine blade is introduced. The drawback of this configuration lies in the operation of loading the blade into the cart since to perform the loading step either the cart must be moved from the tip of the blade to the position of the blade where the cart can support the blade weight, or the blade must be moved into the cart by means of using an overhead travelling crane and cables. In addition to the undesirable complexity of such conventional blade handling systems, operation of these conventional systems require a variety of movements which present high risk of blade damage when introducing and removing the various components.

Some exemplary conventional blade handling systems are disclosed in WO 2013092597, WO 2012048719, US 20140356113, EP 2584191, JP2010216317, each of which is hereby incorporated by reference it its entirety, including the particular blade contacting elements and relative range of motions disclosed.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a wind turbine blade apparatus comprising: a root device including: a base having an upper surface with a radius of curvature and configured to receive a portion of a wind turbine blade, at least one housing disposed on a lateral side of the base and including a groove configured to receive a bearing, a shaft extending at least partially through the base and housing, at least one bearing disposed at least partially within the housing. The apparatus also includes a tip device having: a base, a rotatable support frame with: a first support configured to receive a pressure side of a wind turbine blade, a second support configured to receive a suction side of a wind turbine blade, and an opening configured to receive a portion of a wind turbine blade.

In some embodiments, the rotatable support frame of the tip device has an external radius of curvature.

In some embodiments, the base of the tip device includes a bottom surface and a top surface, the top surface having a curved geometry.

In some embodiments, at least one of the root device or tip device provides two degrees of freedom of the turbine blade.

In some embodiments, at least one of the root device or tip device provides two degrees of freedom of the turbine blade about the tilt and yaw axes of the turbine blade.

In some embodiments, the root device and tip device are separate components.

In some embodiments, at least one of the root device or tip device includes a plurality of casters.

In some embodiments, at least one of the root device or tip device includes at least one balancer.

In some embodiments, at least one of the root device or tip device includes a propulsion mechanism for rotating the wind turbine blade.

In some embodiments, the root device and the tip device are aligned with a common longitudinal axis.

In some embodiments, the root device includes at least one roller, the roller having a longitudinal axis parallel to the longitudinal axis of the blade. The housing(s) can be disposed below the roller(s). Additionally or alternatively, at least one roller can be at least partially disposed above the upper surface of the base of the root device.

In some embodiments, the groove of the housing guides movement of the blade about an axis perpendicular to a longitudinal axis of the blade.

In some embodiments, the upper surface of the root device has a radius of curvature generally equivalent to the outer surface of the blade.

In some embodiments, the first and second supports of the tip device are selectively actuatable to engage with a surface of a wind turbine blade.

In some embodiments, the rotatable support frame of the tip device is rotatable about a longitudinal axis of the blade.

In some embodiments, the tip device includes a base having at least one roller, with a concave outer surface.

In some embodiments, the tip device includes at least one ball transfer unit, the ball transfer unit configured to inhibit axial deflection of the support frame during rotation.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for handling, e.g. clamping, securing, rotating and transporting a wind turbine blade. The system and apparatus disclosed herein can be used to facilitate various finishing processes of the wind turbine blade manufacturing. In an exemplary embodiment, this system consists of two separate apparatus called "Root Device" and "Tip device" as shown within the figures included herein.

Figure 1:
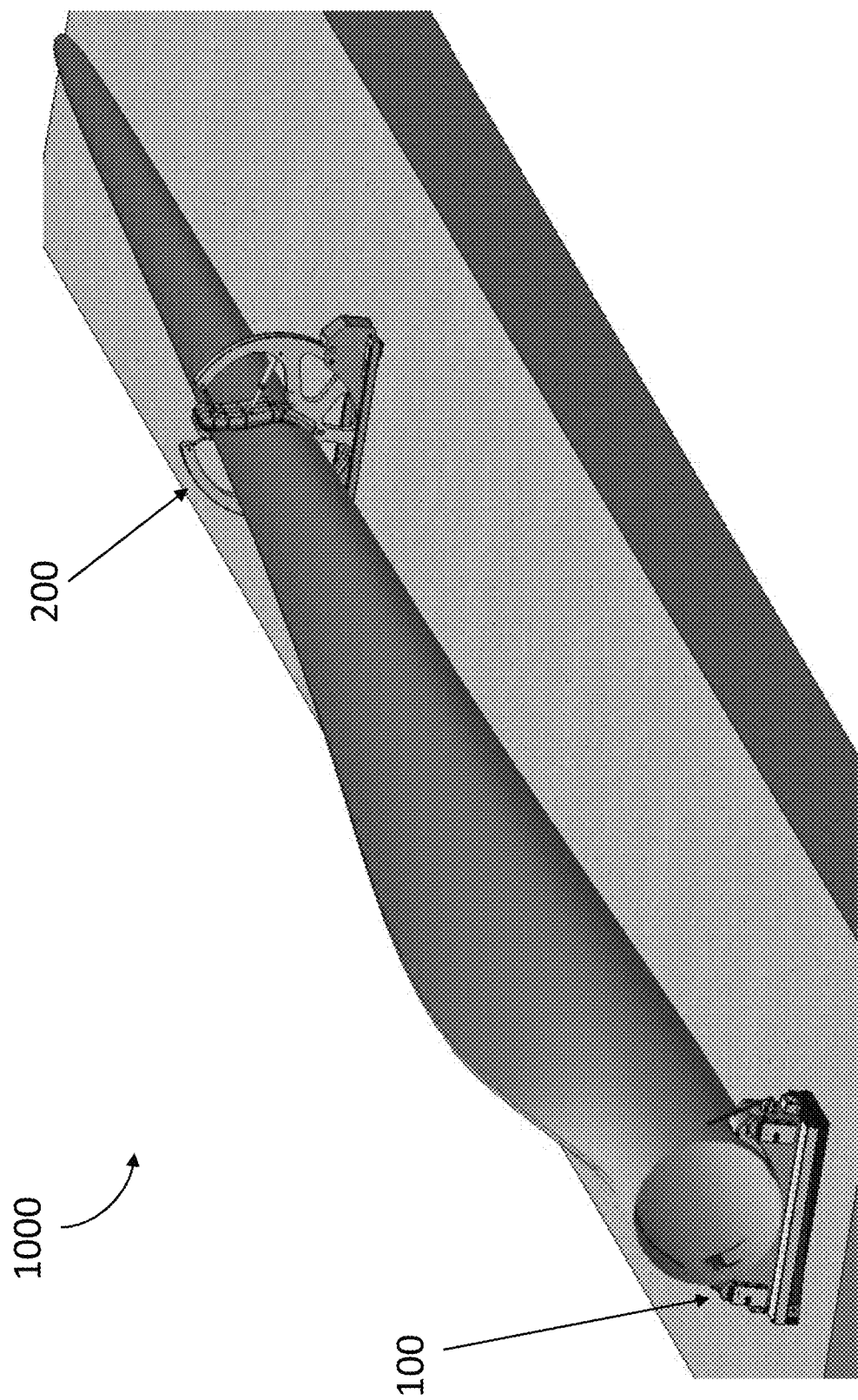
FIG. 1 depicts an exemplary wind turbine blade handling apparatus, including a root device and tip device in accordance with the embodiments disclosed herein.

As shown in FIG. 1, the system 1000 generally includes a Root Device (100) and a Tip Device (200). These subsystems 100, 200 provide additional handling functions and the ability to handle larger wind turbine blades with higher efficiency, accessibility and ergonomics than conventional handling systems.

Self-Aligned Tilt & Yaw System—Root Device (100)

Figure 2:
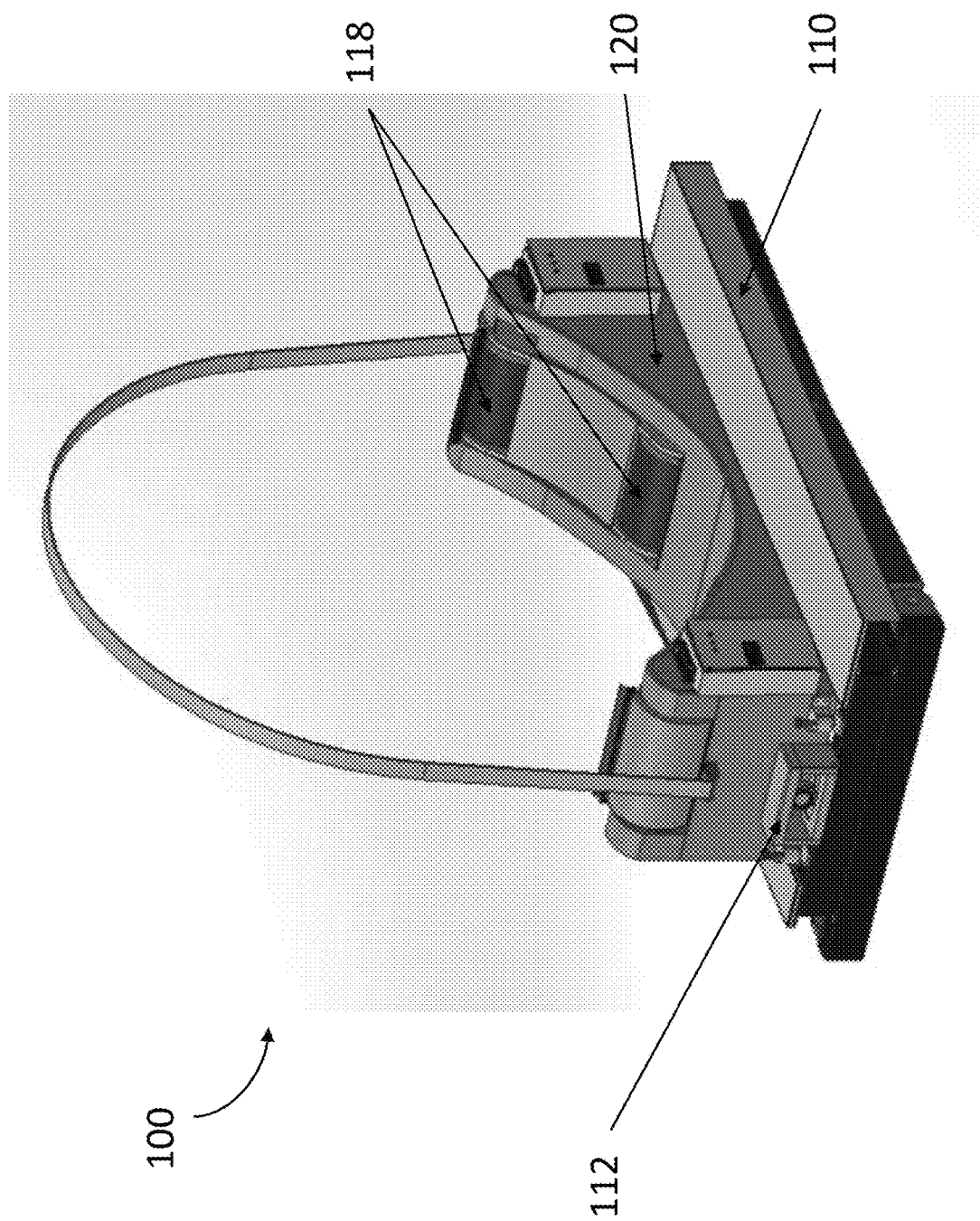
FIG. 2 is a perspective view of the root device of FIG. 1.
Figure 3:
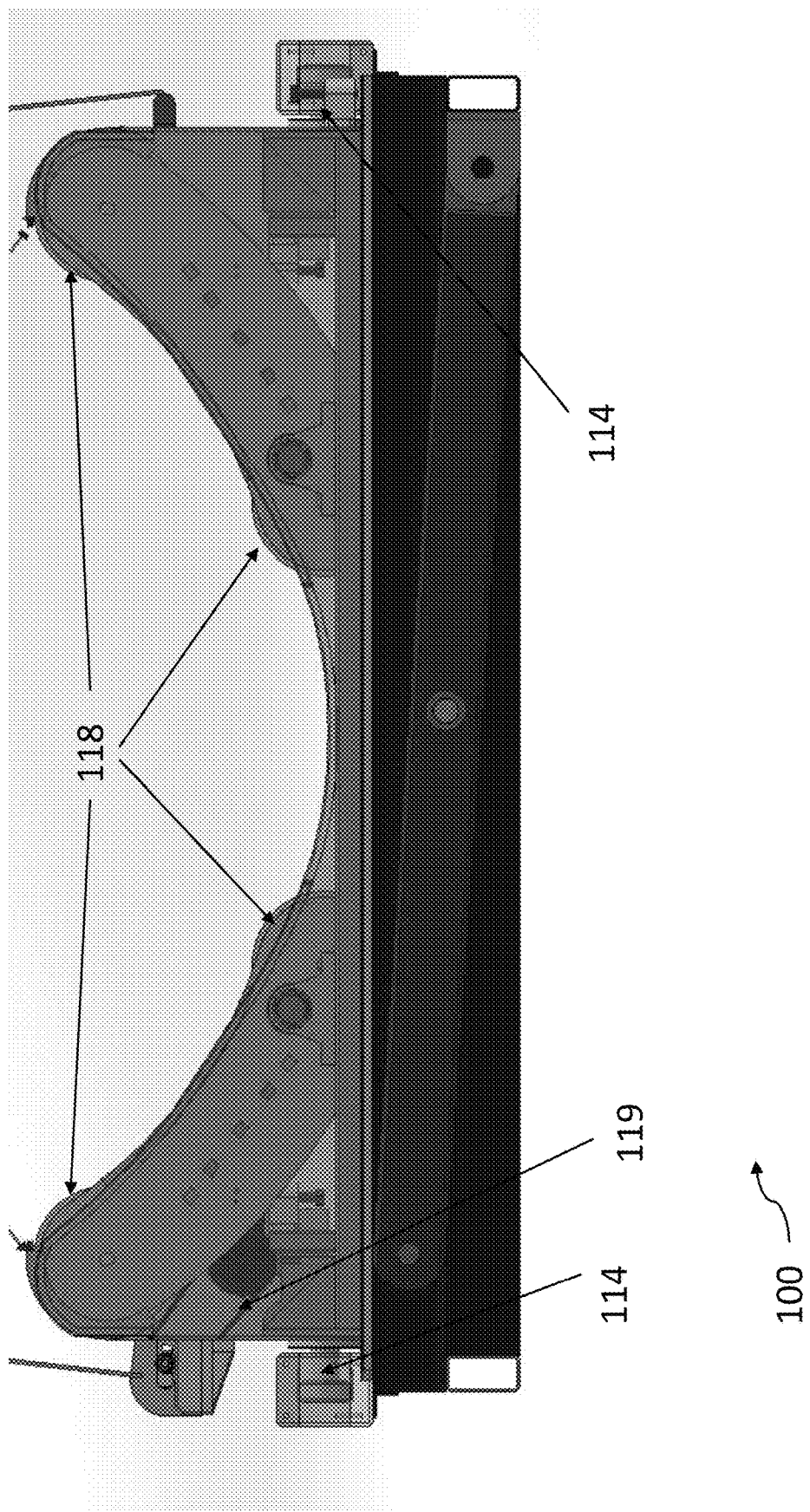
FIG. 3 is a front view of the root device of FIG. 1.
Figure 4:
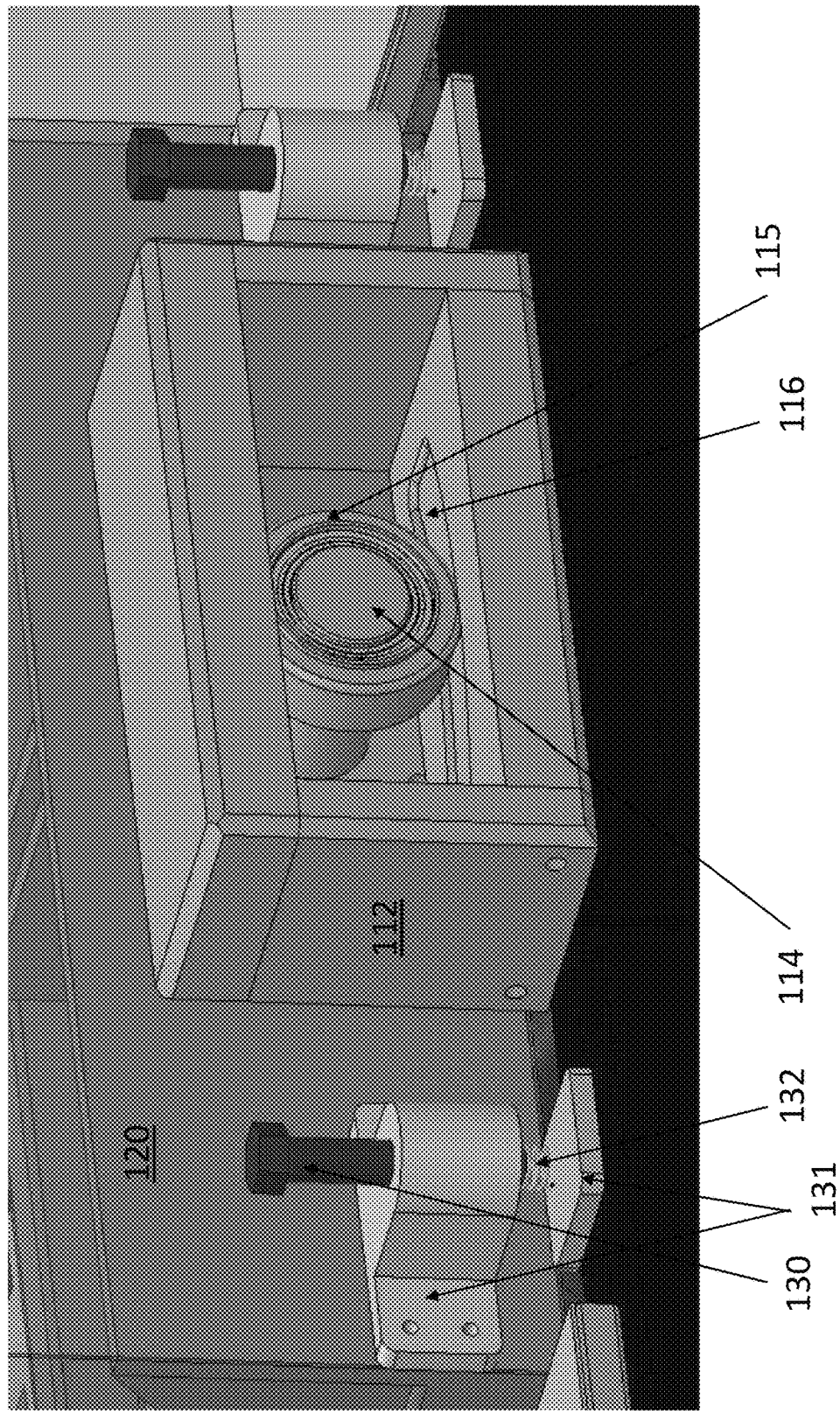
FIG. 4 is a front-perspective enlarged view of the base section of the root device of FIG. 1.

The Root Device (100) includes a base (110) and a root support member (120), as shown in FIGS. 2-4. The root support member (120) can be a single, integral unit, or can be comprised of a plurality of discrete units which can be joined together or otherwise connected to receive and support a wind turbine blade.

The Root Device (100) is adapted to receive the root portion of the wind turbine blade, and to rotate the blade (at various speeds). Accordingly, the root support member (120) is configured with a complimentary shape to the wind turbine root, e.g. arcuate. The root support member (120) can comprise a curved shape with a radius which is similar to the outer radius of the root portion. In more general terms, the shape of the root supporting member is adapted to the shape of the root portion. In some embodiments the root support member 120 can be adjustable to accommodate varying root geometries.

The power to generate the movement (e.g. rotation about the blade longitudinal axis) of the wind turbine blade can be provided in a variety of ways, e.g. electric motor, pneumatic or hydraulic systems. In some embodiments, the power means (and associated wiring, cables or piping, as the case may be) are housed directly within the Root Device. In other embodiments, the power source, and/or auxiliary power systems, can be located external to the Root Device (100) housing.

The Root Device (100) includes a shaft (114) and bearings (115), within housings (112) on the sides of the base (110), as shown in FIG. 4. In some embodiments, the shaft (114) extends beyond the edge of the root support member (120), in some instances, on both sides of the root support member (120). The housing (112) includes a bottom plate having a groove or track (116) formed therein for guiding movement of the shaft (114). This track (116) guides movement of the blade about an axis perpendicular to the blade's longitudinal axis, e.g. yaw. The track (116) also governs the range of motion permissible for this movement. The shaft (114) can be formed with a head portion that is received within the track (116). The head of the shaft can be a structural feature integrally formed with the shaft, or a separate part, e.g. threaded nut, that is attached to the shaft (114). In some embodiments, the head can serve as a braking mechanism adjust the resistance to movement of the shall within the track (116).

The range of motion of the shaft (114) within track (116) can be monitored and controlled via software programming which can set a predetermined limit or location on the track that corresponds to an angular displacement, e.g., tilt or yaw of the blade. Additionally, an alarm can be included to notify personnel that the limit is approaching, has been reached, or exceeded. Similarly, the resistance to movement (e.g. provided by the head of shaft 114) can be adjusted during transit of the shaft (114) such that as the shaft approaches the limits of its range of motion, the resistance is increased thereby slowing down the momentum of the apparatus.

In some embodiments, the range of motion of the shaft (114) within track (116) is designated with ±4 degree movement within the yaw direction. In such embodiments, the range of motion can be a function of the blade's weight and rotation of the blade. Additionally, the shaft (114) allows the system to rotate a tilt direction and dampening system (130,131,132) limits the rotation of the shaft (114) with, e.g., ±4 degrees. In some embodiments, this permits the root device (120) to move relative to the base (110).

The Root Device also includes rollers (118) for engaging the blade and facilitating rotation of the blade along the blade longitudinal axis. In some embodiments, the rollers (118) can be configured to extend or protrude outwardly from the root support member (120), when in the empty or unloaded configuration (i.e. when no blade is present on the Root Device). These rollers (118) can then be depressed or sunk, independently of each other, once a blade is deposited onto the Root Device, thereby engaging the roller (118). Such independent movement allows the blade to be leveled/balanced within the root device. This relative movement or displacement of the rollers can be a linear trajectory in some embodiments (e.g. vertically up/down). In other embodiments, the rollers (118) may be pivoted relative to the root support member (120). In some embodiments, the rollers 118 are rigidly mounted to the root support member (120) with the only permissible motion being rotation about their central axes. The roller engages, and facilitates rotation, with the root portion of the blade by surface friction. Accordingly, when the power driving means are applied to the rollers (118) each roller begins to rotate, which in turn, causes the blade to rotate. The rollers (118) can be metal structures which are coated with a coating (e.g., PU) on the outer surface to increase the friction force between the blade and the roller.

The dimensions of the rollers are configured to correlate with a dimensions of the blade, e.g. when handling a heavier blade, a larger/longer roller is used than for handling a lighter rotor blade. However, the length of the rollers may correlate with a specific design, e.g. having an eccentric shape, of the rotor blade and/or maintaining a desired surface pressure between the rollers and the rotor blade. Employing flexible rollers which can adjust in positioning is advantageous in that it allows the system to adapt to blades of different radii and/or shapes.

In some embodiments, the rollers (118) can be configured as conveyor belts with a strap of gripping material wrapped around adjacent rollers. In such embodiments, the surface area in contact with the blade is thus increased compared to the discrete roller configuration. Also, each of the conveyor belts can cling to the blade independently of the other conveyor belts. As a result, in each case a high contact surface is achieved even with components having different diameters, via which each of the conveyor belts rests against the component in a force-locking manner. As a result, the turning device ensures reliable holding of the component even with different component diameters. In some embodiments, the spacing between rollers (118) is adjustable, and the total number of rollers (118) employed can be greater or less the four depicted in the exemplary embodiment shown.

As shown in FIG. 3, the shaft (114) extends into the root support member (120), but terminates before reaching the bottom of the rollers (118). Also shown in FIG. 3, in some embodiments the power means may be connected to only select, e.g. one, roller (118) to drive rotation of the blade. As shown in FIG. 3, the left-most roller (118) is connected to a drive belt (119) which is powered to induce rotation of the roller.

The Root Device (100) also includes adjustable balancers, which in the exemplary embodiment illustrated in FIGS. 2-4, include bolt (130) and spring (132) members which are coupled via brackets (131). A first bracket can telescopingly receive a bolt (130) which rests upon a second bracket that provides a normal force to counteract the weight of the root support member (120). As shown in FIG. 4, the first bracket which receives bolt (130) can be attached to the root support member (120) and the second bracket can be attached to a separate structural component, e.g. base (110). The spacing between brackets (130) can be adjustable.

This balancing system holds the root support member (120) in place and is built on a degree of freedom, e.g. ±4°, at two axes such that the system will displace, e.g. rise/fall, to one side up to its limits because of upper structure's weight and center of gravity. Thus, before the blade is received, the Root Device (100) is maintained at approximately 0° position at both axis (yaw, tilt). As the blade is lowered into engagement, the edge of the rollers within the device contact the blade meanwhile positioning the blade and avoiding damage the blade surface. These adjustable balancers provide the benefit of balancing the device based on the empty weight of the device itself (i.e. without a blade deposited therein). Another advantage of these adjustable balancers is that they provide a dampening feature to absorb some of the load/vibration within the device during operation, and maintain the degree of freedom within its predefined (though variable for different blades and/or setting) limits. Additionally, the springs (132) can serve to dampen or absorb the load applied when a blade is deposited within the Root Device at their tilt and yaw angle limits)(±4°, thereby reducing the risk of damage. The balancers can also tighten the Root Device such to prevent or inhibit vibratory loads incurred during the rotation of the blade. The exemplary embodiment shown depicts the balancers as a mechanical system (e.g. spring), however additional or alternative balancers (e.g. pneumatic or hydraulic) can be employed if so desired.

In some embodiments, the balancers are included at the edges or corners of the root support member (120). The balancers (130-132) can be included on both lateral sides, and spaced equidistant from the housing (112).

The Root Device (100) operates in concert with the Tip Device, described in further detail below. Thus, in accordance with an aspect of the present disclosure, during operation, the blade weight and rotation angle control the system, without need for any additional control mechanisms. Additionally, the housing (and shaft 114 and guiding track 116) and balancers provide two degrees of freedom (tilt and yaw) to the Root Device. The range of motion within these directions can be limited, as desired, depending on blade size and Root Device size and location within the plant.

Self-Aligned Tilt & Yaw System—Tip Device (200)

The Tip Device (200) includes a base (210) and a tip support frame (220), as shown in FIGS. 5-8. The tip support frame (220) can be a single, integral unit, or can be comprised of a plurality of discrete units which can be joined together or otherwise connected to receive and support a wind turbine blade. Additionally, the tip support frame (220) can be positioned at any desired location along the blade span and need not be located proximate the absolute tip of the blade.

Figure 5:
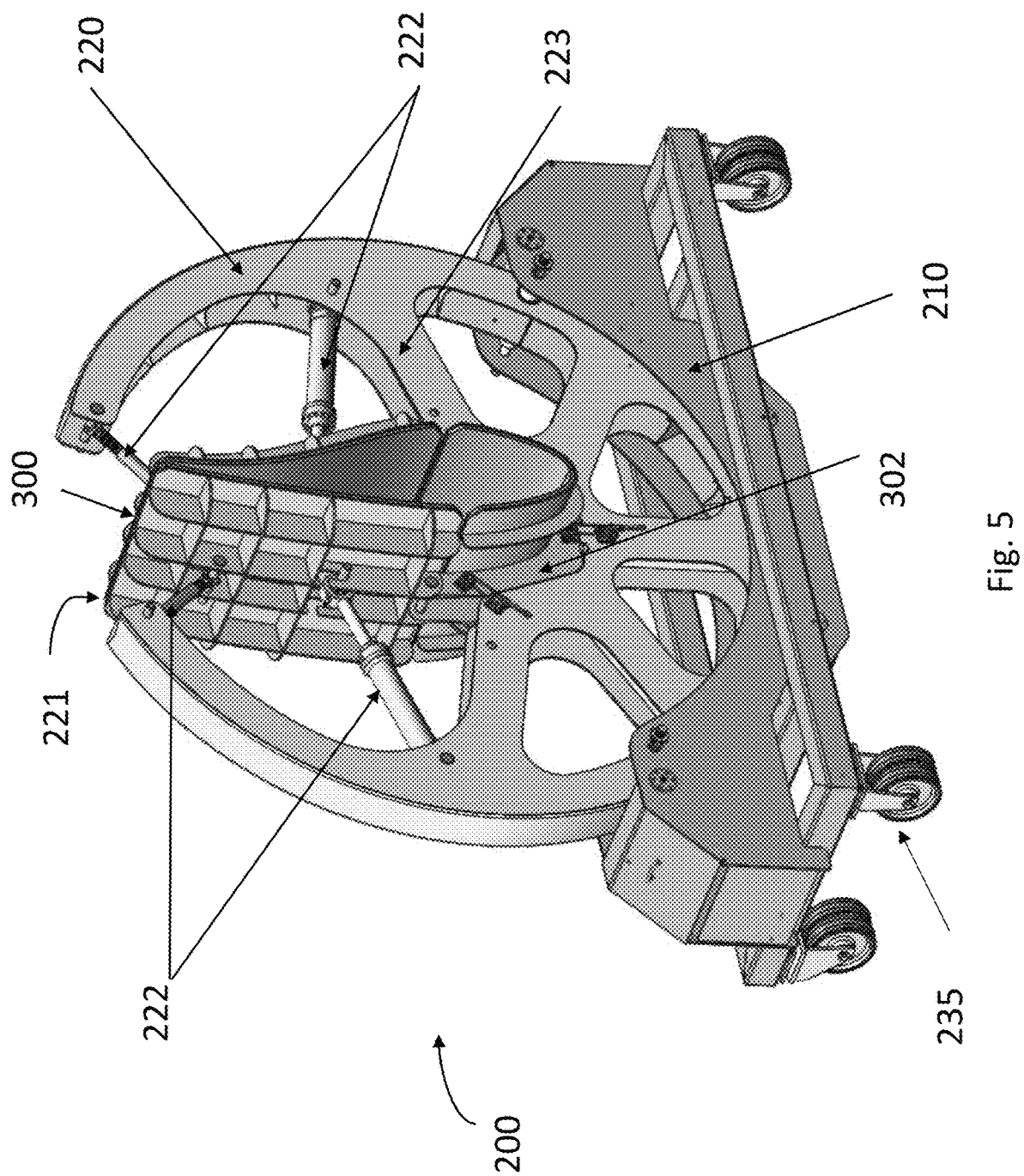
FIG. 5 is a perspective view of the tip device of FIG. 1.

The Tip Device (200) can also include support members 222 which can be selectively, and independently of each other, actuatable to advance and retract within the tip support frame (220). The support members (222) can be actuated via electrical, pneumatic or hydraulic means. Further, the support members (222) can include a connection mechanism (e.g. clasp, clamp, etc.) to securely and releasably attach to the blade core, or template 300 as shown in FIG. 5. As shown, the tip core or template 300 can include fins on an exterior surface with engagement pins extending therebetween. The support members (222) can be attached to select pins and/or fins, as desired. These support members allow for precise positioning and control of the blade tip during movement of the blade, e.g. rotation.

In the exemplary embodiment shown, the tip support frame (220) can be formed with a generally circular structure having an opening (221) in which to receive the blade (not shown for sake of clarity). Also, the tip support frame (220) can include spokes (223) for engaging the blade tip. In the embodiment shown in FIG. 5, the spokes (223) are configured as I-beam members with flanges that matingly engage with corresponding fins/flanges of the blade tip core, or template 300. This configuration serves as an interlocking coupling to provide further stability and control of the blade during movement.

A blade housing template (300) which serves as a sleeve or shroud to receive the wind turbine blade therein, as shown in FIG. 5, can also be provided which can be matingly received by the tip support frame (220). The template (300) can be formed as a two-piece component which is secured, e.g. clamped, together to securely retain the blade within. The pieces can be hinged together in a clamshell fashion, or be separate pieces which are releasably coupled together and securely locked to retain the blade during various modes of movement. The interior surface of the template (300) can include a coating or layer of material which cushions or protects the blade surface from damage.

In operation, a blade is positioned within the housing template (300) which is then inserted through opening (221) into the tip support frame (220). The tip-end of housing template (300) is configured to matingly engage with the tip support frame (220). For example, the fins (302) on the exterior surface of the template (300) can be sized to overlappingly engage (e.g. via friction fit) with the I-Beam flanges of the tip support frame spokes (223) to securely lock the template into the tip support frame (220). Then the support members (222) can be advanced to releasably engage the exterior surface of the template, e.g., by locking onto the pins extending between fins (302), as shown in FIG. 5. Pistons within each support member (222) can be actuated to eliminate any slack or freedom of movement of the template (300) with respect to the frame (220). In the exemplary embodiment shown, an equivalent number of support members (222) and spokes (223) (i.e. four) are provided.

Figure 6:
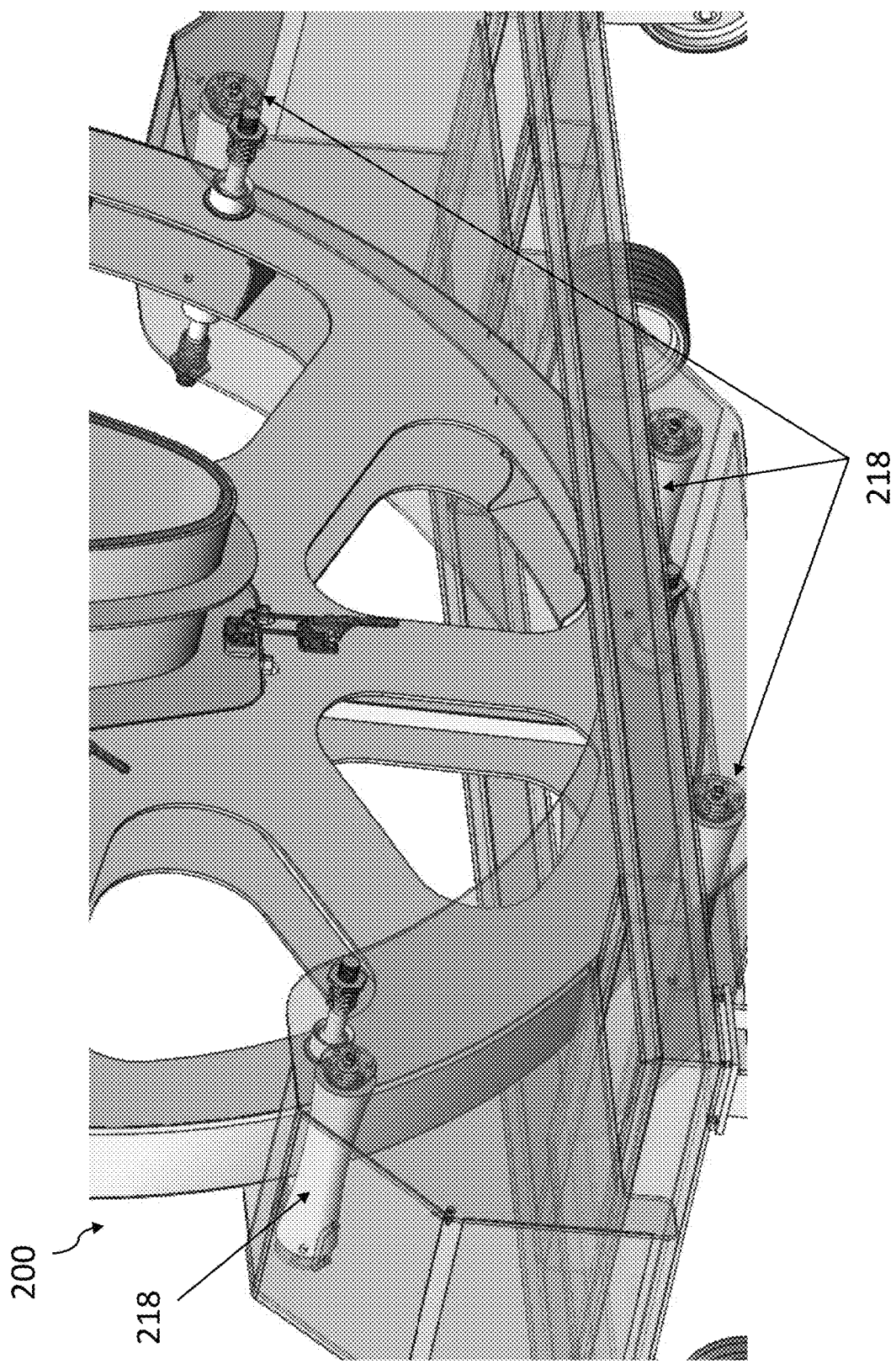
FIG. 6 is a front-perspective enlarged view of the tip device of FIG. 1.
Figure 7:
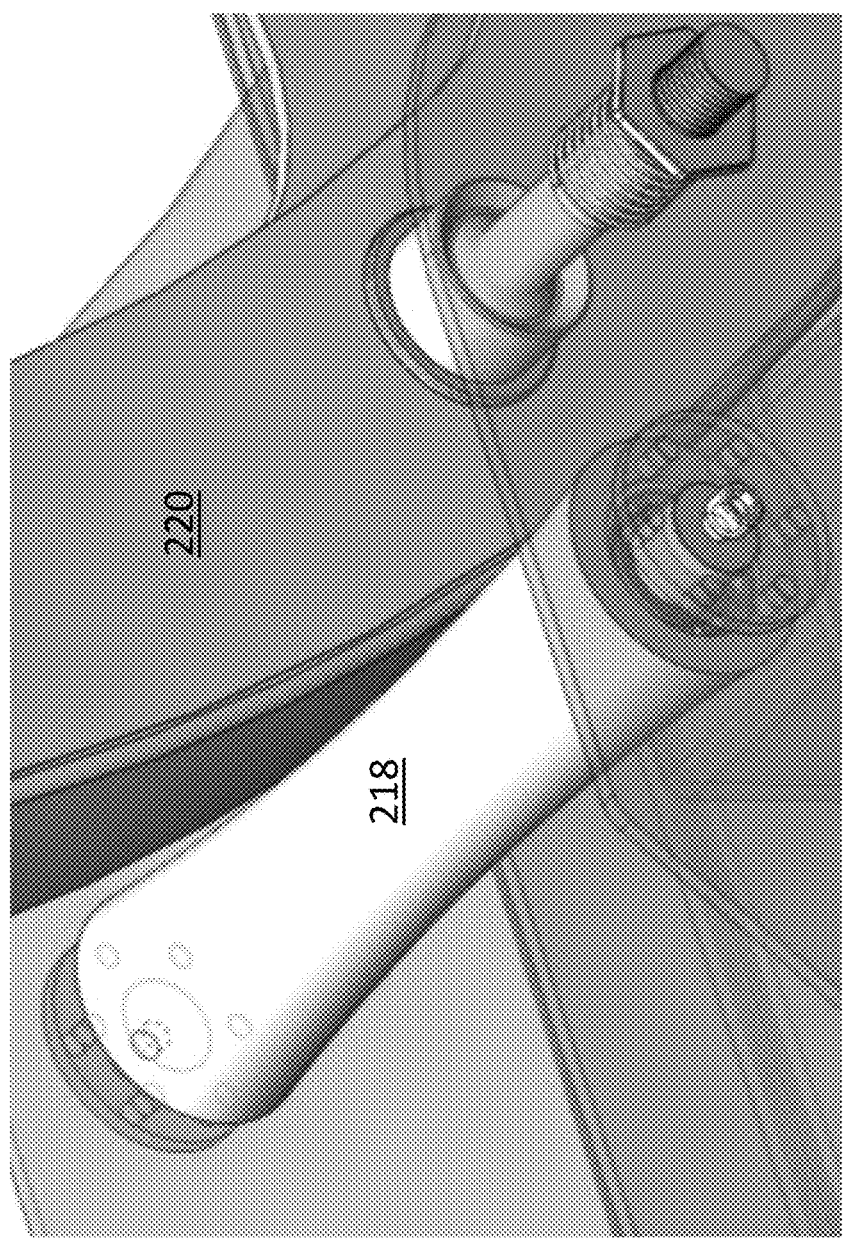
FIG. 7 is an enlarged view of the base section of the tip device of FIG. 1.
Figure 8:
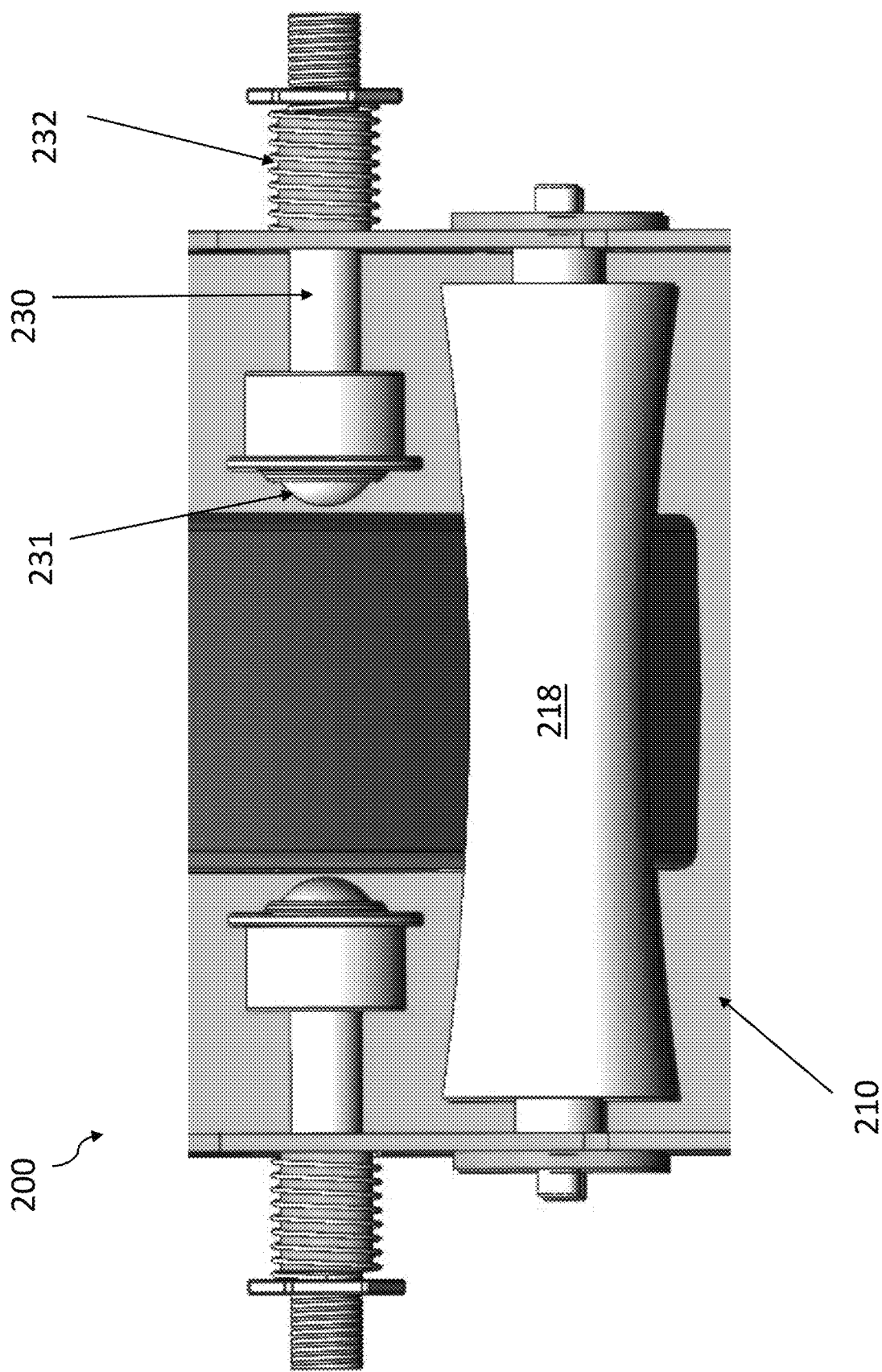
FIG. 8 is an interior view of the base section of the tip device of FIG. 1.

The tip support frame (220) outer (or circumferential) edges are provided with a complimentary radius as that of the Root Device (100). To facilitate rotation of the tip support frame (220) a series of rollers (218) can be included within the base (210), as shown in FIGS. 6-8. In this exemplary embodiment, four rollers (218) are mounted within the base (210), and have a concave surface which is complimentary to the convex surface of the tip support frame (220). In some embodiments, the rollers (218), like the rollers (118) of the Root Device, can be coupled to the power means to generate movement of the blade tip. Alternatively, the Root Device can drive the rotation of the blade while the tip support frame passively rotates as the rotational moment is transferred though the blade and into the Tip Device (200) via the rollers (218). Furthermore, the Tip Device (200) can be equipped with multi-directional casters (235) to permit movement of the Tip Device, as desired about the shop floor.

The Tip Device (200) also includes adjustable balancers, which in the exemplary embodiment illustrated in FIGS. 5-8, include bolt (230) and springs (232) and ball transfer units (231). This balancing system holds the tip support frame (220) in place. Similar to the Root Device (100) described above, the adjustable balancers of the Tip Device (200) provides a predefined, e.g. ±4°, range of motion about two axes (e.g. tilt, yaw) such that the system will displace, e.g. pivot or shift, to one side up to its limits because of upper structure's weight and center of gravity. The ball transfer units are allowed to rotate or spin, in order to prevent or inhibit axial deflection of the tip support frame (220) during rotation, thereby minimizing any deviation or "wobbling" of the tip support frame which can cause undesired loading. Moreover, in the event contact is made between the tip support frame (220) and the ball transfer unit (231), the spring 232 can absorb the associated load. Significantly, the balancers function to permit rotation of the blade, without disturbance or resistance thereto.

In the exemplary embodiment shown in FIGS. 5-6, two sets of balancers are provided in the base (210) and located at approximately the 4'oclock and 8 o'clock positions relative to the tip support frame (220). Each location includes a balancer sub-assembly (230-232) on a front surface of the base (210) and a rear surface of the base (210) (the rollers 218 can be disposed entirely within the base 210). The balancers can be adjustable to receive tip support frames (220) of varying geometry.

Thus, in accordance with an aspect of the present disclosure, the Tip Device (200) provides four degrees of freedom (e.g. about tilt and yaw axes). The range of motion within these directions can be limited, as desired, depending on blade size and Tip Device size and location within the plant.

In accordance with another aspect of the present disclosure, the Root Device (100 and Tip Device (200) can be arranged as separate and independently operable components. In some embodiments the Root Device and Tip Device can include position indicating mechanisms which convey the relative position of one component with respect to another. For example, an optical, e.g. laser, mechanism can be included which alerts the user when the Root Device and Tip Device are properly aligned (e.g. with respect to the blade longitudinal axis). If the Tip Device were accidentally displaced, an alarm can notify the user to take corrective action to bring the Tip Device back into alignment so as to not induce any undesired loads on the blade, or support apparatus. Preferably, the system disclosed herein is synchronized with the Root Device and Tip Device coordinated to move, e.g. rotate, at the same time and at the same speeds.

Moreover, the Root Device and Tip Device can be configured to restrict relative movement therebetween, such that each apparatus moves in concert with the other (e.g. relocated along a shop floor) without imparting any loads on the blade disposed therein.

It will be understood that once the blade is supported within the Root Device and Tip Device any external support means, e.g. a harness, a crane, etc., for the blade can be removed. In some embodiments, the portions of the apparatus which engage the blade (or core) can include a protective cover to prevent damage and further absorb or cushion against undesired load transfer. Embodiments of the wind turbine blade handling system as described above may be flexible and can adapt to various rotor blade positions. This can result in smaller loads on the rotor blade. As a consequence, the risk of damages to the rotor blade is reduced.

Accordingly, the present disclosure provides a variety of improvements and benefits to wind turbine blade handling, some examples include:
 1. Present disclosure can accommodate different pre-bended blade types
 2. Tip Device's diameter will reduce and structural stability will be more homogeneous.
 3. Blade can be rotated within lesser volume necessity.
 4. Allows using lifting systems for root or tip constructions of the blade rotating devices.

5. Larger blade's rotation angles and surface accessibility will be increased.
6. Blade will undergo less stress during rotation
7. System is self-aligned so ne need of pre-adjustment.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A wind turbine blade apparatus comprising:
    a root device, the root device including:
        a base, the base having a root support member with an upper surface with a radius of curvature and configured to receive a portion of a wind turbine blade,
        at least one housing disposed on a lateral side of the base, the housing including a groove configured to receive a bearing,
        a shaft extending at least partially through the base and housing,
        at least one bearing, the at least one bearing disposed at least partially within the housing, wherein the shaft can be displaced within the housing,
        at least one roller at least partially disposed above an upper surface of the base,
        wherein the housing is disposed below at least one roller; and
    a tip device, the tip device including:
        a base,
        a template,
        a rotatable support frame, the rotatable support frame having:
            a first support configured to receive a first template side engaging a pressure side of a wind turbine blade,
            a second support configured to receive the first template side engaging a suction side of a wind turbine blade, and
            an opening, the opening configured to receive a portion of a wind turbine blade.

2. The wind turbine apparatus of claim 1, wherein the rotatable support frame of the tip device has an external radius of curvature.

3. The wind turbine apparatus of claim 1, wherein base of the tip device includes a bottom surface and a top surface, the top surface having a curved geometry.

4. The wind turbine apparatus of claim 1, wherein displacement of the shaft within the housing of the root device and movement of at least one dampener provides two degrees of freedom of the turbine blade.

5. The wind turbine apparatus of claim 1, wherein displacement of at least one set of adjustable balancers provides two degrees of freedom of the turbine blade about the tilt and yaw axes of the turbine blade.

6. The wind turbine apparatus of claim 1, wherein the root device and tip device are separate components.

7. The wind turbine apparatus of claim 1, wherein at least one of the root device or tip device includes a plurality of casters.

8. The wind turbine apparatus of claim 1, wherein at least one of the root device or tip device includes at least one balancer.

9. The wind turbine apparatus of claim 1, wherein at least one of the root device or tip device includes a propulsion mechanism for rotating the wind turbine blade.

10. The wind turbine apparatus of claim 1, wherein the root device and the tip device are aligned with a common longitudinal axis.

11. The wind turbine apparatus of claim 1, wherein the root device includes at least one roller, the roller having a longitudinal axis parallel to the longitudinal axis of the blade.

12. The wind turbine apparatus of claim 11, wherein at least one roller is at least partially disposed above the upper surface of the base of the root device.

13. The wind turbine apparatus of claim 1, wherein the groove of the housing guides movement of the blade about an axis perpendicular to a longitudinal axis of the blade.

14. The wind turbine apparatus of claim 1, wherein the upper surface of the root device has a radius of curvature generally equivalent to the outer surface of the blade.

15. The wind turbine apparatus of claim 1, wherein the first and second supports of the tip device are selectively actuatable to engage with a surface of a wind turbine blade.

16. The wind turbine apparatus of claim 1, wherein the rotatable support frame of the tip device is rotatable about a longitudinal axis of the blade.

17. The wind turbine apparatus of claim 1, wherein the tip device includes a base having at least one roller.

18. The wind turbine apparatus of claim 1, wherein the at least one roller of the tip device has a concave outer surface.

19. The wind turbine apparatus of claim 1, wherein the tip device includes at least one ball transfer unit, the ball transfer unit configured to inhibit axial deflection of the support frame during rotation.

* * * * *